(12) United States Patent
Ishikawa (10) Patent No.: US 10,669,652 B2
(45) Date of Patent: Jun. 2, 2020

(54) METAL FABRIC, SHEET SET, DECORATION, STATIONERY, CONTAINER AND METHOD OF MANUFACTURING CONTAINER

(71) Applicant: Ishikawa Wire Netting Co., Ltd., Tokyo (JP)

(72) Inventor: Yukio Ishikawa, Tokyo (JP)

(73) Assignee: ISHIKAWA WIRE NETTING CO., LTD., Tokyo (JP)

(*) Notice: Subject to any disclaimer, the term of this patent is extended or adjusted under 35 U.S.C. 154(b) by 307 days.

(21) Appl. No.: 15/477,358

(22) Filed: Apr. 3, 2017

(65) Prior Publication Data
US 2017/0283995 A1 Oct. 5, 2017

(30) Foreign Application Priority Data

Apr. 5, 2016 (JP) .................................. 2016-076134
Oct. 26, 2016 (JP) .................................. 2016-210051

(51) Int. Cl.
*D03D 15/02* (2006.01)
*D03D 15/00* (2006.01)
(Continued)

(52) U.S. Cl.
CPC ............... *D03D 15/02* (2013.01); *B32B 1/02* (2013.01); *B32B 3/02* (2013.01); *B32B 3/14* (2013.01); *B32B 3/26* (2013.01); *B32B 5/022* (2013.01); *B32B 5/024* (2013.01); *B32B 5/06* (2013.01); *B32B 5/26* (2013.01); *B32B 7/02* (2013.01); *B32B 7/06* (2013.01); *B65D 1/22* (2013.01); *D03D 15/0083* (2013.01); *B32B 2250/02* (2013.01); *B32B 2250/03* (2013.01); *B32B 2250/20* (2013.01); *B32B 2250/44* (2013.01); *B32B 2255/02* (2013.01);
(Continued)

(58) Field of Classification Search
None
See application file for complete search history.

(56) References Cited

U.S. PATENT DOCUMENTS

| 6,581,212 B1 | 6/2003 | Andresen | |
|---|---|---|---|
| 2005/0098277 A1* | 5/2005 | Bredemus | D03D 9/00 160/371 |
| 2017/0198422 A1 | 7/2017 | Ishikawa | |

FOREIGN PATENT DOCUMENTS

| JP | H07068336 A | 3/1995 |
|---|---|---|
| JP | 2002-154190 A | 5/2002 |

(Continued)

OTHER PUBLICATIONS

Machine tranlsation of JP2016033280, Ishikawa (Year: 2016).*
(Continued)

*Primary Examiner* — Shawn Mckinnon
(74) *Attorney, Agent, or Firm* — Westerman, Hattori, Daniels & Adrian, LLP (57) ABSTRACT

A metal fabric (10) has a sheet form, using metal threads for warp (30) as the warp, and metal threads for weft (20) as the weft, wherein each of the metal threads for warp (30) and the metal threads for weft (20) has an average diameter of 0.03 mm or larger and 0.09 mm or smaller, the metal threads for warp (30) and the metal threads for weft (20) may be plain-woven, and the metal fabric (10) may be shaped in a square with a side of 100 mm or longer and 200 mm or shorter.

18 Claims, 6 Drawing Sheets

(51) Int. Cl.
  *B32B 7/06* (2019.01)
  *B32B 5/06* (2006.01)
  *B32B 1/02* (2006.01)
  *B32B 5/26* (2006.01)
  *B65D 1/22* (2006.01)
  *B32B 5/02* (2006.01)
  *B32B 7/02* (2019.01)
  *B32B 3/26* (2006.01)
  *B32B 3/02* (2006.01)
  *B32B 3/14* (2006.01)

(52) U.S. Cl.
  CPC ... *B32B 2262/02* (2013.01); *B32B 2262/0269* (2013.01); *B32B 2262/08* (2013.01); *B32B 2262/103* (2013.01); *B32B 2307/402* (2013.01); *B32B 2307/546* (2013.01); *B32B 2307/732* (2013.01); *B32B 2439/62* (2013.01); *B32B 2451/00* (2013.01); *D10B 2101/20* (2013.01); *D10B 2401/062* (2013.01)

(56) References Cited

FOREIGN PATENT DOCUMENTS

| JP | 2002524671 | * | 8/2002 |
|---|---|---|---|
| JP | 2002524671 A | | 8/2002 |
| JP | 2005068613 A | | 3/2005 |
| JP | 2007039839 | * | 2/2007 |
| JP | 2007039839 A | | 2/2007 |
| JP | 2010129847 | * | 6/2010 |
| JP | 2010129847 A | | 6/2010 |
| JP | 2016033280 | * | 3/2016 |
| JP | 2016033280 A | | 3/2016 |

OTHER PUBLICATIONS

Machine translation of JP2010129847, Isobe et al. (Year: 2010).*
Machine translation of JP2007039839, Tatsumi et al. (Year: 2007).*
Machine translation of JP2002524671 (Year: 2002).*
Office Action dated Oct. 3, 2017, issued in Japanese Patnet Application No. 2016-210051 with machine translation.
Document submitted with Japan Patent Office on May 2, 2016 in order to apply an exception of loss of novelty under Article 30 of Japan Patent Law, which was submitted in Japanese Patent Application No. 2016-076134, w/English concise explanation (37 pages).
Document submitted with Japan Patent Office on Nov. 7, 2016 in order to apply an exception of loss of novelty under Article 30 of Japan Patent Law, which was submitted in Japanese Patent Application No. 2016-210051, w/English concise explanation (3 pages).

* cited by examiner

METAL FABRIC, SHEET SET, DECORATION, STATIONERY, CONTAINER AND METHOD OF MANUFACTURING CONTAINER

This application is based on Japanese patent application No. 2016-76134 filed on Apr. 5, 2016 and Japanese patent application No. 2016-210051 filed on Oct. 26, 2016, the contents of which are incorporated hereinto by reference.

BACKGROUND

Technical Field

This invention relates to a metal fabric, a sheet set that includes a plurality of the metal fabrics, a decoration folded from the metal fabric, stationery and a container, and a method of manufacturing the container.

Related Art

Origami is a traditional plaything having been handed down in Japan. Origami, as its name suggests, is made of paper that can be folded up into a desired shape, after folded along fold lines formed under pressurizing force applied through fingers. Paper is however liable to degrade when brought into contact with water, light, fungi and so forth, so that it is difficult for the folded work to keep its final form that can be appreciated over a long duration of time. For the same reason, it has been difficult as well to use the folded origami work as a decoration (accessory) to be attached to one's body or belongings.

JP-A-2002-154190 discloses an origami that is composed of a sheet article having inside thereof a metal core for ensuring plasticity and a fiber-reinforced resin (FRP) layer, and having paper laminated on the outer surface of the FRP layer. For the metal core for ensuring plasticity, a wire mesh or a thin perforated metal is used. With the metal core for ensuring plasticity incorporated therein, the origami has reportedly been given a high strength, and been able to keep its final form after crafted.

SUMMARY

The origami disclosed in JP-A-2002-154190 is characterized in that the superficial paper layer is reinforced by the FRP layer and the metal core, so that the tendency of degradation of the paper layer remains unchanged from the conventional paper-made origami, although the retainability of the final form of the folded work could be improved. The folded work can therefore not be appreciated over a long duration of time.

This invention, in consideration of the above-described subjects, is to provide a sheet article that can be folded, like the conventional origami, by fingers up into an object that can be appreciated over a long duration of time.

According to this invention, there is provided a sheet-like metal fabric that includes metal threads for warp as the warp and metal threads for weft as the weft, each of the metal threads for warp and the metal threads for weft having an average diameter of 0.03 mm or larger and 0.09 mm or smaller.

According to this invention, there is also provided a sheet set that includes a plurality of the metal fabrics described above, having integrally packaged therein a first sheet of the metal fabric whose metal threads for warp and metal threads for weft are composed of a copper alloy, consequently looks gold, and a second sheet of the metal fabric whose metal threads for warp and metal threads for weft are composed of an aluminum alloy or stainless steel, consequently looks silver.

According to this invention, there is also provided a decoration, stationery and a container folded from the metal fabric described above.

BRIEF DESCRIPTION OF THE DRAWINGS

The above and other objects, advantages and features of this invention will be more apparent from the following description of certain preferred embodiments taken in conjunction with the accompanying drawings, in which.

DETAILED DESCRIPTION

The invention will be now described herein with reference to illustrative embodiments. Those skilled in the art will recognize that many alternative embodiments can be accomplished using the teachings of this invention and that the invention is not limited to the embodiments illustrated for explanatory purposes.

Embodiments of this invention will be explained referring to the attached drawings. Note that, in all drawings, all corresponding constituents will have same reference numerals or symbols, in order to properly avoid repetitive descriptions.

Figure 1:
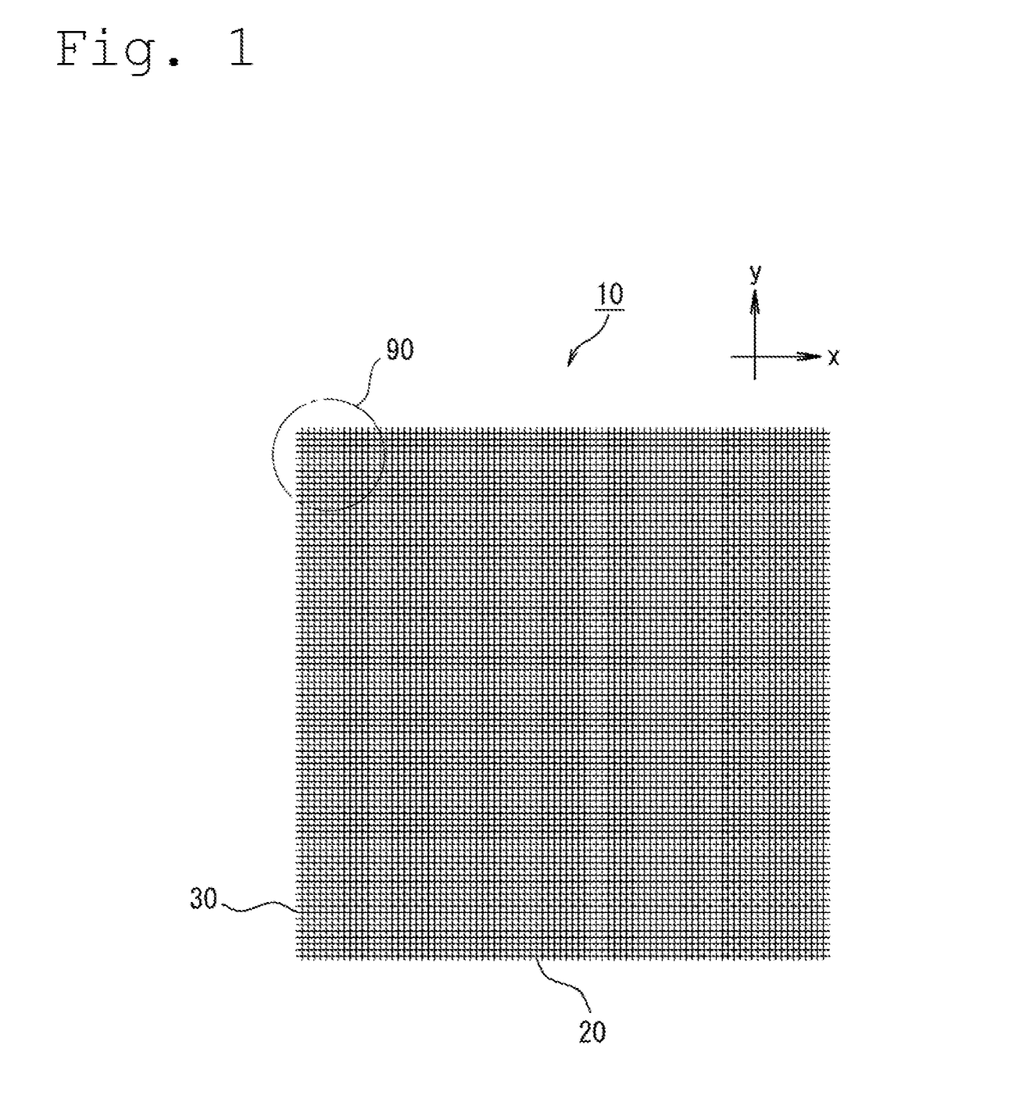
FIG. 1 is a plan view illustrating a metal fabric according to a first embodiment of this invention.
Figure 2:
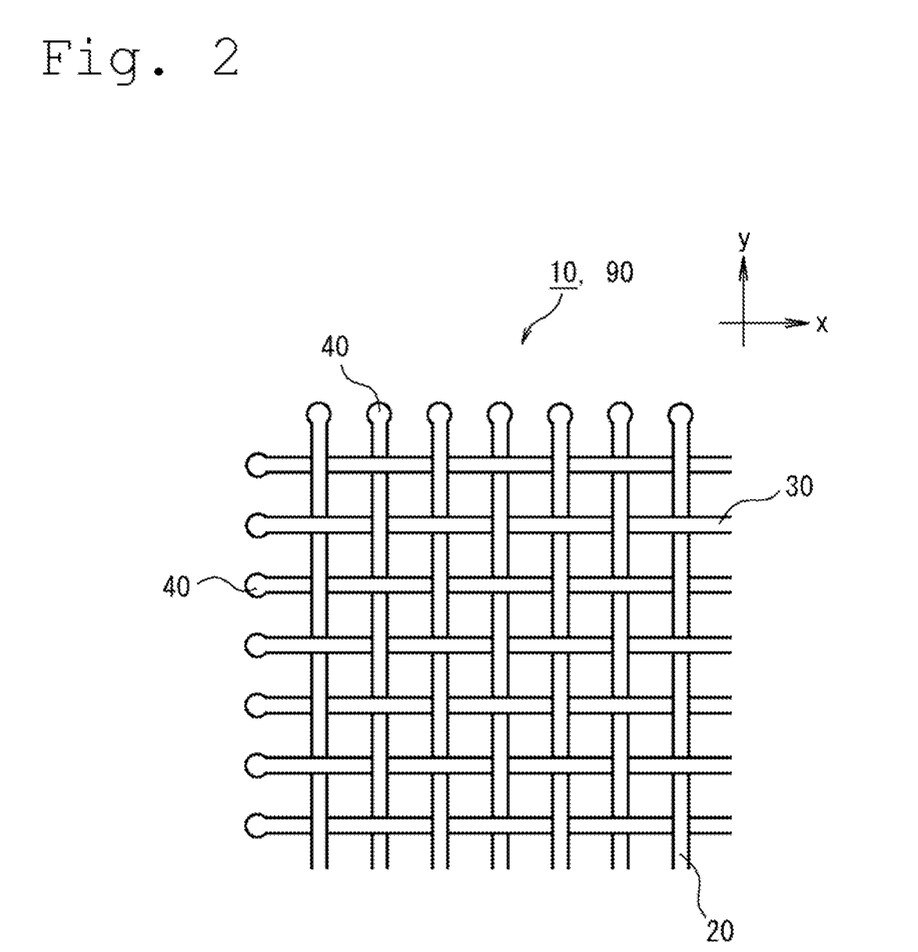
FIG. 2 is an enlarged view of a corner part of the metal fabric illustrated in FIG. 1.

FIG. 1 is a plan view illustrating a metal fabric 10 according to a first embodiment of this invention. FIG. 2 is an enlarged view of a corner part 90 of the metal fabric 10 illustrated in FIG. 1.

First, this embodiment will be outlined. The metal fabric 10 is a sheet-like woven fabric made of metal, and uses metal threads for warp 30 as the warp, and metal threads for weft 20 as the weft. Each of the metal threads for warp 30 and the metal threads for weft 20 has an average diameter of 0.03 mm or larger and 0.09 mm or smaller.

The metal fabric 10 of this embodiment is a woven fabric formed by weaving the metal threads for warp 30 and the metal threads for weft 20 into a mesh. The metal fabric 10 is a wire mesh usable as origami. Now, the x-y direction is defined in FIG. 1 for the convenience sake, wherein the x direction will be denoted as the weft direction, and the y direction will be denoted as the warp direction. The metal threads that lie in the weft direction will be denoted as "metal threads for weft 20", and the metal threads that lie in the warp direction will be denoted as "metal threads for warp 30". The word "sheet-like" regarding the metal fabric 10 means that the metal fabric 10 is thin, without needing perfect flatness of the metal fabric 10.

The metal fabric 10 looks square in the plan view as seen in FIG. 1. The flat dimension of the metal fabric 10 may be, but not specifically limited to, 100 mm or larger and 200 mm or smaller. Within the range, the metal fabric 10 will be handleable like common paper-made origami. The metal fabric 10, when intended for use as origami, may be provided as hobby goods mainly for children, or as a material for paper crafts mainly for adults.

A metal material for composing the metal threads for warp 30 is selectable from copper, aluminum, nickel, titanium, gold, silver, platinum, iron, zinc, tin, lead, and alloys of these metals. More specifically, the metal material for composing the metal threads for warp 30 is more preferably selectable from the group consisting of copper (pure copper), copper alloy, aluminum alloy, stainless steel and titanium. Also a metal material for composing the metal threads for weft 20 is preferably any of those selectable from the group described above. As the copper alloy, usable are brass, red brass, phosphor bronze, cupronickel and copper-gold alloy. Since red brass and brass look gold, and SUS looks silver, so that the metal fabric 10 composed of these metals will have excellent appearances.

The metal fabric 10 may have exposed thereon intact surfaces of the metal threads for warp 30 and the metal threads for weft 20, or may have entirely or partially printed surface. Printing may be provided by a variety of means, and may typically be provided in color using an ink jet printer.

The metal fabric 10 has a large number of metal threads for warp 30 and the metal threads for weft 20. The numbers of the metal threads for warp 30 and the metal threads for weft 20 may be same or different. Such large number of the metal threads for warp 30 may be a group of metal threads composed of only the same metal material, or may be a group consisting of two or more kinds of metal threads composed of different metal materials. The same will apply also to the metal threads for weft 20.

The metal threads for warp 30 and the metal threads for weft 20 may be composed of the same metal, or of different metals. Now "the metal threads for warp 30 and the metal threads for weft 20 are composed of different metals" means that the major ingredient of metal contained in the metal threads for warp 30 and the major ingredient of metal contained in the metal threads for weft 20 are different.

Metal materials composing the metal threads for warp 30 or the metal threads for weft 20 may have a Young's modulus of 60 GPa or larger and 220 GPa or smaller, and preferably 100 GPa or larger and 220 GPa or smaller. Both of the metal materials composing the metal threads for warp 30 and the metal threads for weft 20 may have a Young's modulus of 60 GPa or larger and 220 GPa or smaller.

For each of the metal threads for warp 30 and the metal threads for weft 20, the metal material may be used unmodified, or may be used after coating the surface thereof. The coating may be clear, may have an achromatic color such as white or black, or may have a chromatic color. The chromatic color is selectable from red, yellow, blue, green and so forth, without special limitation.

The metal threads for warp 30 and the metal threads for weft 20 may have the same diameter, or the one may be thicker than the other. As described previously, the average diameter of each of the metal threads for warp 30 and the metal threads for weft 20 is preferably 0.03 mm or larger and 0.09 mm or smaller, and more preferably 0.03 mm or larger and 0.06 mm or smaller. Although a preferred diameter of the metal threads for warp 30 or the metal threads for weft 20 may slightly vary depending on metal material(s) to be selected, the average diameter of the metal threads for warp or the metal threads for weft 20 preferably falls within the above-described ranges so long as the metal materials enumerated above are used. With the average diameter of each of the metal threads for warp 30 and the metal threads for weft 20 controlled to 0.03 mm or larger, the metal fabric 10 will have a desired level of stiffness, so that the metal fabric 10 when folded can give definite fold lines. The present inventors have found from our investigations that, when the metal threads for warp 30 and the metal threads for weft 20 were formed using the various metal materials enumerated above, the metal fabric became difficult to give definite fold lines when the average diameter is controlled to 0.1 mm or larger, due to an excessive elastic restoring force, and in contrast by controlling the average diameter to smaller than 0.1 mm, and particularly to 0.09 mm or smaller, the metal fabric 10 was found to distinctively change its property when folded, and could give definite folding lines, like the paper-made origami. Also by controlling the average diameter of the metal threads for warp 30 and the metal threads for weft 20 to 0.09 mm or smaller, the metal fabric 10 can be folded like paper-made origami, without applying an excessively large force as compared with the paper-made origami. The average diameter of the metal threads for warp 30 and the metal threads for weft 20 is determined by averaging the diameters measured at several points between both ends of the threads, excluding the later-described lump portions 40 formed at the ends.

At least one face of the metal threads for warp 30 or the metal threads for weft 20 may have a chromatic color. The chromatic color is a color other than achromatic color such as white and black, and metallic colors such as gold and silver. The chromatic color is available by using a colored threads that are coated as described above. Alternatively, titanium threads, and in particular colored titanium threads obtainable by photocatalytic treatment of the titanium threads may be used as the metal threads for warp 30 or the metal threads for weft 20.

The mesh number of the metal fabric 10 is preferably 100 mesh or larger and 250 mesh or smaller. If the mesh number is too small, the metal threads will be creased only with difficulty when energized with fingers, due to their strong unfolding tendency, so that the metal fabric 10 will be folded only with difficulty even under pressure applied through fingers, unlike the paper-made origami. On the contrary, if the mesh number is too large, the metal threads need to be thinned, and this will make it difficult to achieve the preferred average diameter described above. The mesh number means the number of meshes which fall within one inch (25.4 mm). The mesh is an opening surrounded by the metal threads for warp 30 and the metal threads for weft 20. The mesh numbers of the metal fabric 10 in the warp direction and the weft direction may be same or different.

A preferred mesh number of the metal fabric 10 is determined in consideration of correlation with ductility of the metal materials composing the metal threads for warp 30 and the metal threads for weft 20. More specifically, if the metal material composing the metal threads for warp 30 and the metal threads for weft 20 is copper, red brass, brass or aluminum alloy, the mesh number is preferably 120 mesh or larger and 160 mesh or smaller. If the metal material composing the metal threads for warp 30 and the metal threads for weft 20 is phosphor bronze, stainless steel or titanium, the mesh number is preferably 160 mesh or larger and 250 mesh or smaller.

The present inventors found through our earnest examination that, by properly selecting combination of the metal material and the mesh number, it now becomes possible to form clear fold lines on the metal fabric 10 by pressurizing it under fingers, like the paper-made origami, while suppressing formation of unclear fold lines or unfolding.

While the metal fabric 10 of this embodiment may be provided sheet by sheet, it may alternatively be provided in a set of several sheets of metal fabrics 10. In other words, this invention can provide a sheet set (not illustrated) that includes two or more sheets of metal fabrics 10. The sheet set has integrally packaged therein a first sheet of metal fabric, and a second sheet of metal fabric. The first sheet of metal fabric looks gold, as a copper alloy is used for the metal threads for warp 30 and the metal threads for weft 20, meanwhile the second sheet of metal fabric looks silver, as an aluminum alloy or stainless steel is used for the metal threads for warp 30 and the metal threads for weft 20. The sheet set may have packaged together additional metal fabrics that show other chromatic colors such as red, blue and so forth. With such multi-color set of sheets, the user can choose the metal fabric having a color that best matches one's purpose and taste, and can use it as origami.

The metal fabric 10 may be woven by any method of weaving that uses warp and weft, without special limitation, including plain weave, twilled weave, Dutch weave and twilled Dutch weave. The metal fabric 10 of this embodiment is preferably a plain weave that is woven with the metal threads for warp 30 and the metal threads for weft 20. This is because the plain weave has intersections of the metal threads for warp 30 and the metal threads for weft 20 aligned on the orthogonal grid, so that the metal fabric 10 will have formed thereon straight fold lines more easily when it is folded like origami by fingers.

The ends of at least a part of metal threads for warp 30 or the metal threads for weft 20 are rounded to form lump portions 40. In more detail, in the metal fabric 10 of this embodiment, all of the metal threads for warp 30 and the metal threads for weft 20 have the lump portions 40 formed on both ends thereof as illustrated in FIG. 2. With the ends of the metal threads for warp 30 and the metal threads for weft 20 rounded into lumps, the ends of the metal threads for warp 30 and the metal threads for weft 20 are prevented from being caught by fingers when the metal fabric 10 is folded like origami. The lump portions 40 provided to the metal threads for warp 30 also prevent the metal threads for weft 20 from escaping from the metal threads for warp 30. This successfully prevents the metal threads for warp 30 and the metal threads for weft 20 from loosening and escaping from the metal fabric 10, even without providing an anti-fray coating to the edges of the metal fabric 10.

The diameter of the lump portions 40 is not smaller than the diameter of the metal threads for warp 30 and the metal threads for weft 20. The upper limit of the diameter of the lump portions 40 is not larger than the intervals between the neighboring metal threads for warp 30 and the neighboring metal threads for weft 20, so that every lump portion 40 will not interfere with the adjacent ones on the metal threads for warp 30 and on the metal threads for weft 20. The "interval" in this context means the center-to-center distance between the adjacent metal threads for warp 30 (or the metal threads for weft 20). In particular in the metal fabric 10 of this embodiment, the diameter of the lump-like ends is larger than the average diameter of the metal threads for warp 30 or the metal threads for weft 20, and not larger than four times the diameter. Within such range, the above-described effect of preventing the ends of the metal threads for warp 30 and the metal threads for weft 20 from being caught by fingers will be fully demonstrated, and the overall thickness of the metal fabric 10 will be prevented from excessively increasing.

For the manufacture of the metal fabric 10 of this embodiment, it is preferable to manufacture a web by plain-weaving the metal threads for warp 30 and the metal threads for weft 20 on a loom, and then to cut the web into square sheets using a laser cutter. The metal threads for warp 30 and the metal threads for weft 20, when given heat energy through the laser irradiation, will be cut by melting, and will have the lump portions 40 formed at the ends thereof. The lump portions 40 may alternatively be formed by heating or laser irradiation along the sides of the square sheet, after the square sheet was cut out from the plain weave web using a metal blade of an automatic cutting machine.

The metal fabric 10 of this embodiment can provide a variety of decorations (not illustrated) when processed by folding. The decoration may be used as an accessory by attaching it to human body, bag, hat or the like, or may be used by placing it indoor or hanging on a wall. The decoration may have any shape without special limitation, including those modeled after natural objects such as plants and animals, geometric shapes, and other shapes. Alternatively, rather than the decoration, the metal fabric 10 may be folded up into stationary such as book cover and pen case, or container such as trinket box.

Figure 3:
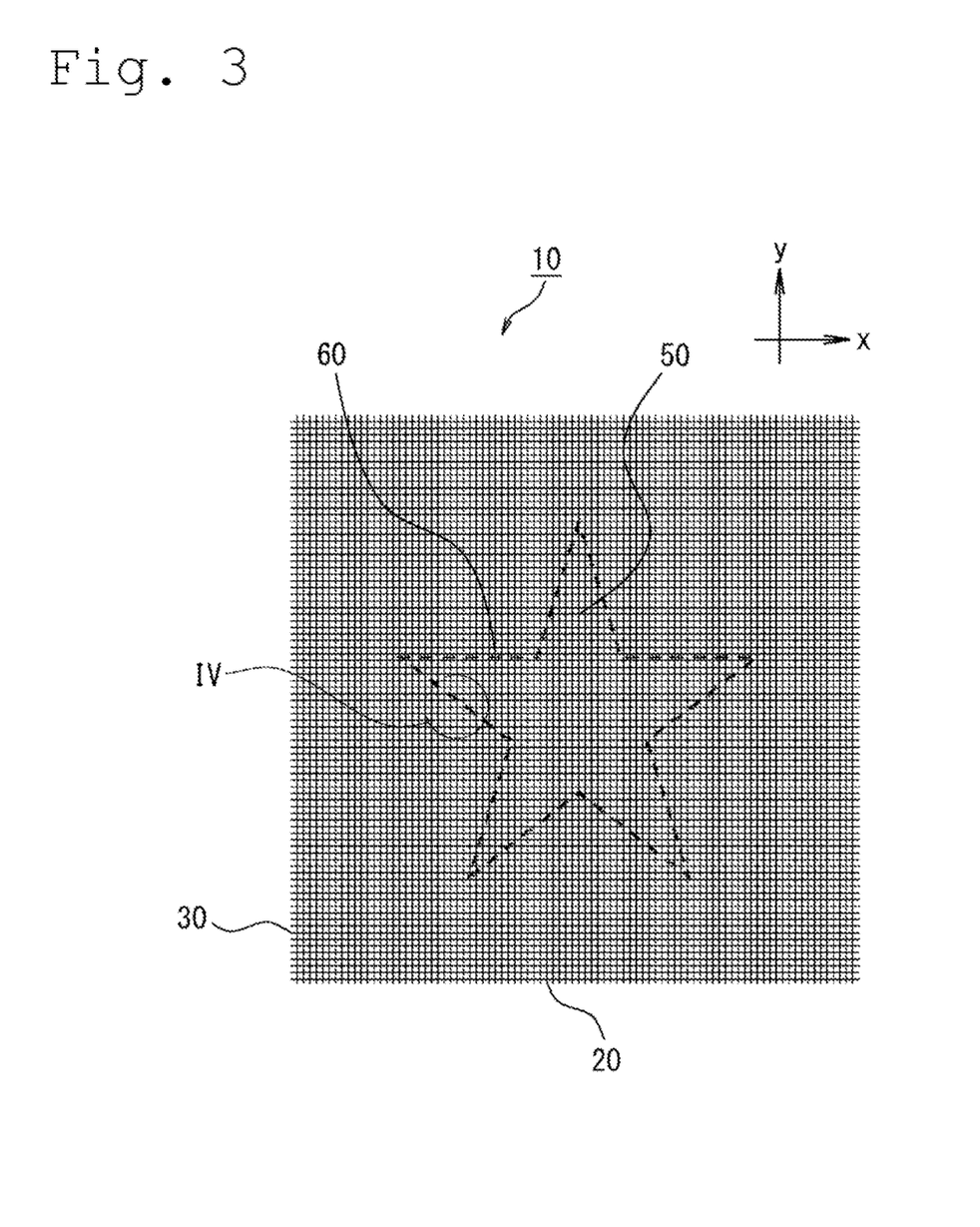
FIG. 3 is a plan view illustrating a metal fabric according to a second embodiment of this invention.

FIG. 3 is a plan view illustrating the metal fabric 10 of a second embodiment. As seen in FIG. 3, the metal fabric 10 of this embodiment is processed by perforating. "Perforating" in this context is a process of making a punch-out portion 50 which is a part of the sheet-like metal fabric 10 easily separable by the user. In other words, the metal fabric 10 may be configured to have the punch-out portion 50 which is separable from the surrounding portion by breaking the perforation.

Figure 4:
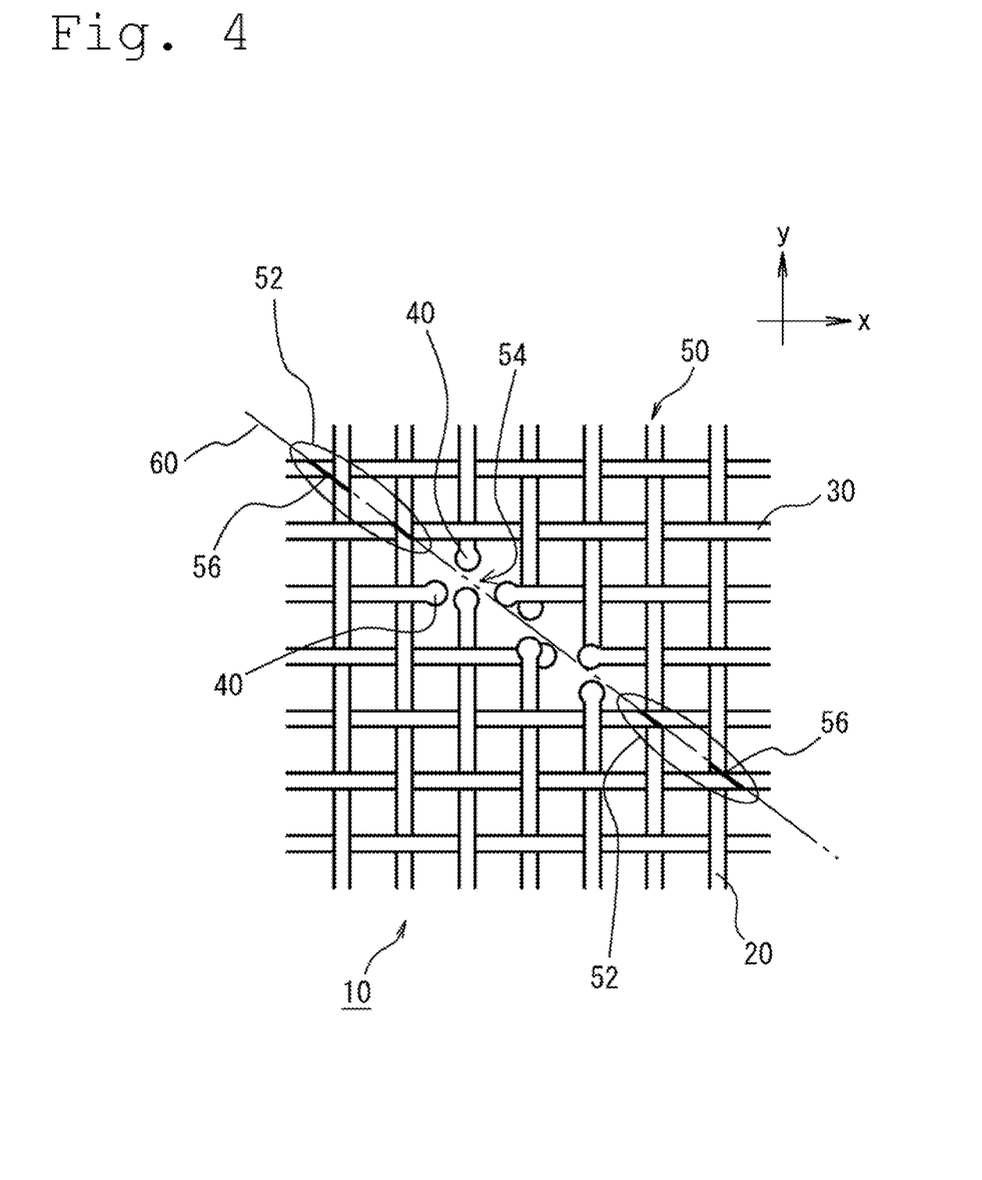
FIG. 4 is an enlarged view of partial area IV illustrated in FIG. 3.

How to embody the punch-out portion 50 is not specifically limited. For example, the punch-out portion 50 having a geometric shape or modeled after some character may be formed at a single point, or at two or more points in the plane of the sheet-like metal fabric 10. Although FIG. 3 illustrates an exemplary case of forming a single astral punch-out portion 50, the dimension, arrangement and quantity of the punch-out portion 50 are freely selectable. The number of the punch-out portion 50 may be two or more, and may typically be several numbers or dozens. When two or more punch-out portions 50 are formed in the metal fabric 10, the individual punch-out portions 50 may have the same shape or different shapes. Such plurality of punch-out portions 50 may be aligned in a grid or in a staggered manner, or may be aligned irregularly (randomly). In FIG. 3, an outline 60 of the punch-out portion 50 is schematically indicated by a broken line. The contour of the punch-out portion 50, which is given by a series of cut ends of the metal threads for warp 30 and the metal threads for weft 20, and can be approximated by using straight lines and curves, is now denoted as the outline 60. In other words, the outline 60 is a virtual line representing the contour of the punch-out portion 50. FIG. 4 is an enlarged view illustrating partial area IV that contains a part of the outline 60 of the punch-out portion 50. In FIG. 4, the outline 60 is indicated by a two-dot chain line.

Alternatively, the punch-out portion 50 may temporarily be attached to the metal fabric 10, after completely punched off from the metal fabric 10 by cutting the metal threads for warp 30 and the metal threads for weft 20 along the entire outline 60. Alternatively again, the metal threads for warp 30 and the metal threads for weft 20 may remain connected between the punch-out portion 50 and the surrounding metal fabric 10, within a partial range of the outline 60.

FIG. 4 illustrates an embodiment in which the punch-out portion 50 remains partially connected to the surrounding metal fabric 10 through connecting portions 52. In other words, the outline 60 of the punch-out portion 50 has discontinued portions 54 where the metal threads for warp 30 and the metal threads for weft 20 are disconnected, and connecting portions 52 where at least either the metal threads for warp 30 or the metal threads for weft 20 remain connected. The connecting portions 52 are portions where at least either the metal threads for warp 30 or the metal threads for weft 20 is kept communicated between the inside and the outside of the punch-out portion 50, meanwhile the discontinued portions 54 are portions where the metal threads for warp 30 and the metal threads for weft 20 are disconnected. By breaking the connecting portions 52, the user can separate the punch-out portion 50 from the metal fabric 10.

Each connecting portion 52 may have formed therein a weakened portion 56. The weakened portion 56 is a portion of the metal threads for warp 30 and the metal threads for weft 20 where the rupture strength thereof is reduced below the original level, so as to allow the user to easily break the metal threads for warp 30 and the metal threads for weft 20 by fingers. The weakened portion 56 is preferably formed so as to extend along the outline 60 of the punch-out portion 50.

The weakened portions 56 may be formed by half-cutting the metal threads for warp 30 and the metal threads for weft 20 to the middle depth with a metal blade. Alternatively, the weakened portions 56 may be formed by irradiating the metal threads for warp 30 and the metal threads for weft 20 with laser using a laser cutter. The irradiation intensity of laser using the laser cutter, when irradiated to the metal threads for warp 30 and the metal threads for weft 20 to form the weakened portions 56, is preferably lower than the irradiation intensity of laser used for cutting the metal fabrics 10 out from the web. The weakened portions 56 are formed by irradiating the laser weakly or only for a short duration of time, so as to melt the metal threads for warp 30 and the metal threads for weft 20 partially in their thickness and kept almost about to break, or so as to degrade the metal material composing the metal threads for warp 30 and the metal threads for weft 20.

Alternative to the embodiment illustrated in FIG. 4, a single weakened portion 56 may be formed over the entire length of the outline 60 of the punch-out portion 50 while leaving the connecting portion 52 over the entire outline 60 of the punch-out portion 50, without forming the discontinued portions 54. In other words, the punch-out portion 50 may be connected with the surrounding metal fabric 10 along the entire outline 60, and a single weakened portion 56 may be formed so as to surround the punch-out portion 50 along the outline 60.

The discontinued portions 54 may be formed by breaking the metal threads for warp 30 and the metal threads for weft 20 using a metal blade or a laser cutter. FIG. 4 illustrates an embodiment in which the ends of the metal threads for warp 30 or the metal threads for weft 20 that face to the discontinued portion 54 are rounded into lumps. As a result of melt-cutting of the metal threads for warp 30 and the metal threads for weft 20 using the laser cutter, the ends thereof faced to the discontinued portion 54 will have formed thereon the lump portion 40. By forming the lump portions 40 on the ends of the metal threads for warp 30 and the metal threads for weft 20 faced to the discontinued portion 54, the punch-out portion 50 may be suppressed from being caught by fingers.

When the punch-out portion 50 is formed using the laser cutter with a constant irradiation intensity of laser, the discontinued portions 54 may be formed preferably by irradiating laser on the metal threads for warp 30 and the metal threads for weft 20 for a longer time, meanwhile the weakened portions 56 may be formed by irradiating laser on the metal threads for warp 30 and the metal threads for weft 20 for a shorter time. In other words, the feed rate of the metal fabric 10 relative to the laser is preferably faster at the weakened portions 56, and slower at the discontinued portions 54. In this way, the punch-out portion 50 whose outline 60 contains the discontinued portions 54 and the weakened portions 56 may be formed by a series of laser irradiation.

The punch-out portion 50 separated from the metal fabric 10 may be used as it is, or after further folding, for various applications such as ornament and decoration. By preliminarily forming two or more, for example several tens of, punch-out portions 50 in the metal fabric 10, such a large number of punch-out portions 50 may easily be obtained by separating them from the metal fabric 10. The surrounding portion of the metal fabric 10 that remains after separation of the punch-out portions 50 may be used as origami, or may be used for manufacturing a variety of decorations, stationery or containers by further folding processes. The metal fabric 10 remained after separation of the punch-out portions 50 may be used as a uniquely patterned sheet having window-like openings at the portions having been occupied by the punch-out portions 50, or may be folded to give the decoration.

Figure 5:
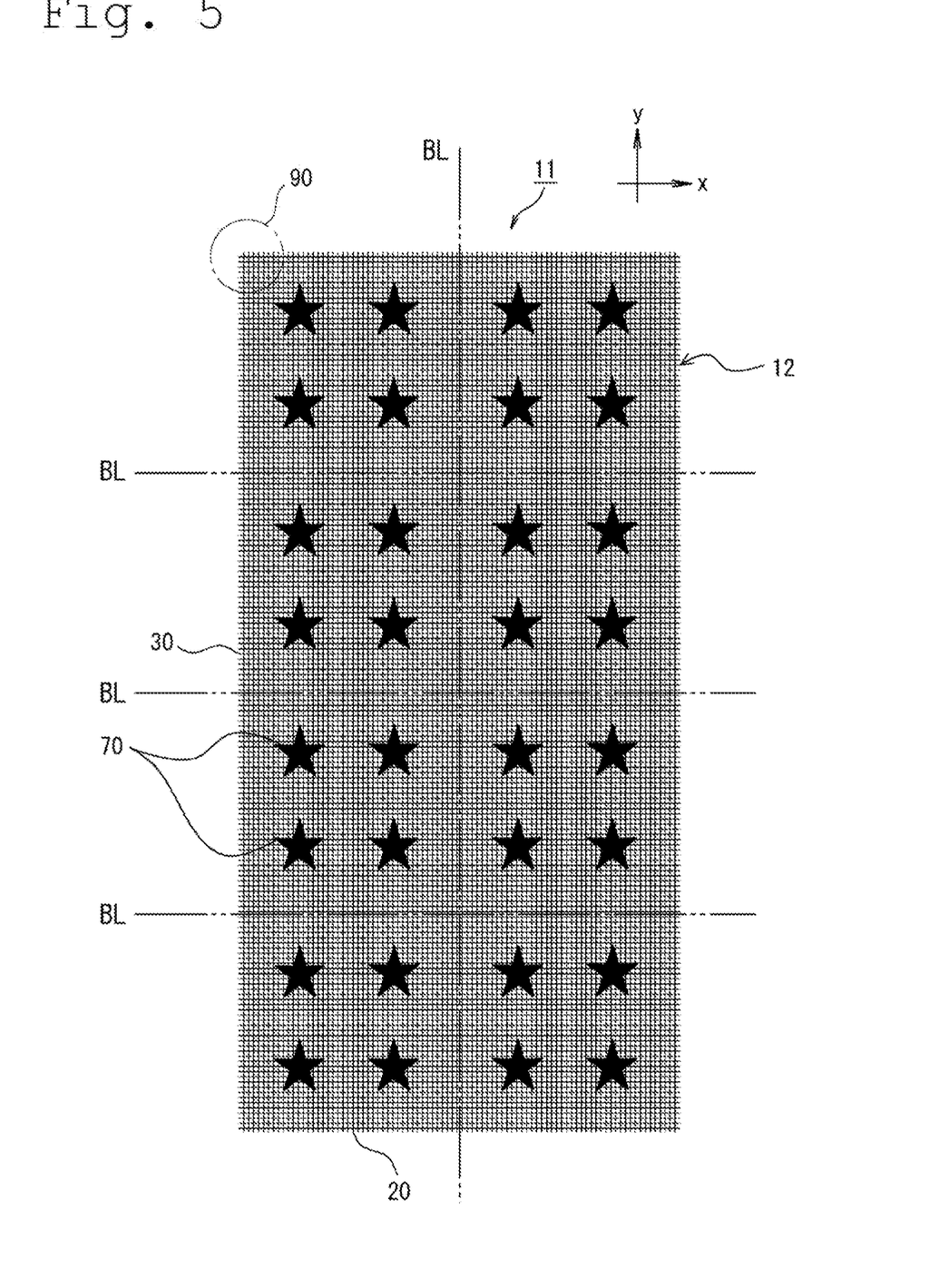
FIG. 5 is a plan view illustrating a long metal fabric according to a third embodiment of this invention.
Figure 6:
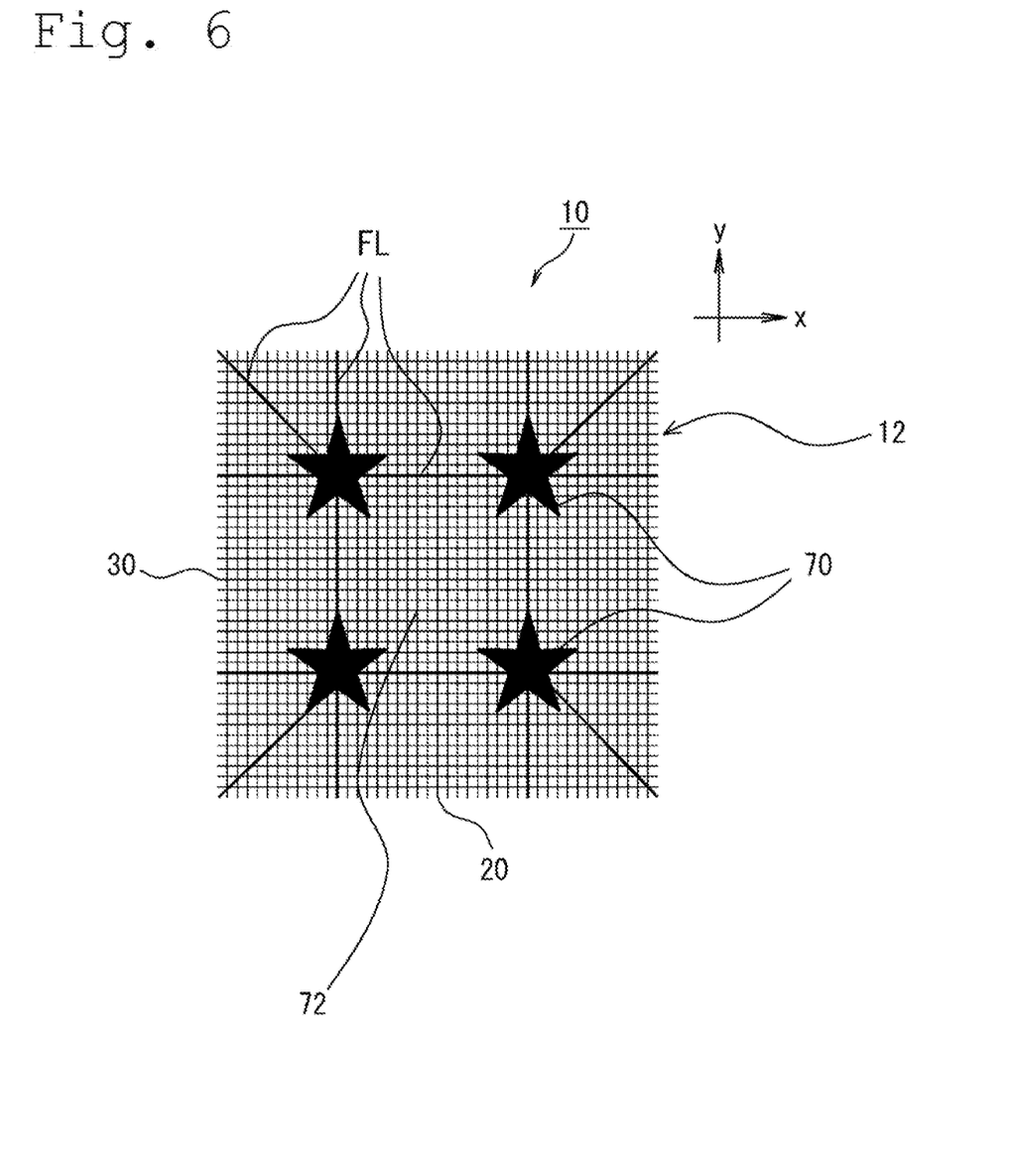
FIG. 6 is a plan view illustrating a square metal fabric obtained by cutting the long metal fabric of the third embodiment at break lines.

FIG. 5 is a plan view illustrating a long metal fabric 11 according to a third embodiment of this invention. FIG. 6 is a plan view illustrating a rectangular (more specifically, square) metal fabric 10 obtained by cutting the long metal fabric 11 of the third embodiment at break lines BL. Break lines BL are virtual lines along which the cutting will take place.

As seen in FIG. 5 and FIG. 6, the metal fabrics 10, 11 of this embodiment have embroideries 70. With the embroideries 70 provided thereon, the metal fabric 10 and a handicraft obtained by folding it will have a good design, and also will be reinforced at the corner portions produced by folding, with the embroideries 70 as described later. The long metal fabric 11 has provided thereon a large number of embroideries 70 arranged so as not to overlap break lines BL. In other words, the metal fabrics 10 are manufactured by cutting the metal fabric 11 between the adjacent embroideries 70. In this way, the embroideries 70 may be prevented from being damaged or from fraying when the metal fabric 11 is cut. The thus cut metal fabric 10 will have a single, or a plurality of embroideries 70 arranged in the inner region thereof excluding the circumferential portion 12.

When the embroideries 70 are provided to the metal fabric 11, an embroidery thread is stitched on the metal fabric 11 with an embroidery lace needle. The embroidery lace needle is preferably a ball-pointed needle that is unlikely to damage the metal threads for warp 30 and the metal threads for weft 20.

The embroideries 70 are composed of an embroidery thread larger in diameter and lower in Young's modulus than the metal threads for warp 30 and the metal threads for weft 20. More specifically, the metal threads for warp 30 and the metal threads for weft 20 have an average diameter of 0.03 mm or larger and 0.09 mm or smaller, and a Young's modulus of 60 GPa or larger and 220 GPa or smaller, meanwhile the embroidery thread composing the embroideries 70 has a diameter of 0.1 mm or larger. For the embroidery thread, usable are handicraft threads such as mole yarn and mohair knitting yarn, yarns made of plastic materials, and any other metal threads smaller in Young's modulus than the metal threads for warp 30 and the metal threads for weft 20. More specifically, excellently designed embroideries 70 and the metal fabric 10 may be obtained, by using dyed yarns such as tie dye (kasuri) yarn; or metal glossy yarns such as lame yarn and spangle yarn. Additionally, silk yarn and nylon yarn are versatile for the embroidery thread.

Although the upper limit of the diameter of embroidery thread is not specifically limited, a twisted yarn or metal twisted yarn intended to be used as the embroidery thread may be as thick as 0.8 mm or around. Meanwhile, woolen yarn may have a diameter of approximately 5 mm or smaller. With such embroidery thread, the metal fabric 10 will not degrade its foldability as origami.

The embroideries 70 may be provided only to one side of the metal fabrics 10, 11, or on both sides thereof. The embroideries 70 may be formed into a single-layered flat structure, or into a multi-layered, three-dimensional structure.

By folding the metal fabric 10 illustrated in FIG. 6, it is now possible to manufacture a decoration, stationery and a container with the embroideries 70 respectively. The container may be a box-type one having corner portions. When such box-type container with the corner portions is manufactured, it is recommendable to allocate each corner portion to each embroidery 70, by folding the metal fabric 10 along a plurality of fold lines FL that pass through the embroidery 70. When the metal fabric 10 illustrated in FIG. 6 is folded into a box-type container, the center portion surrounded by a plurality of (four, in FIG. 6) embroideries 70 will be a bottom part 72 of the container, and the embroideries 70 are positioned one by one at four corners of the bottom part 72. By folding the metal fabric 10 along a plurality of fold lines FL that pass through each embroidery 70 and intersect to each other, the embroideries 70 are positioned to the corner portions, and thereby the corner portions of the container may be reinforced with the embroideries 70.

The metal fabric 10 with the embroideries 70 may be used for various applications besides origami, decoration, stationery and container. For example, the metal fabric 10 may be used as materials for curtain or window shade; apparel material for clothes; material for patchwork; toy; materials for handicrafts; materials for accessories; and filter material. The metal fabric 10 intended to be used as a filter is preferably embroidered over the entire range of the center portion that is used for filtration. In this way, there is obtained a multi-layered filter that includes a metal mesh layer (first layer) composed of the metal threads for warp 30 and the metal threads for weft 20, and a second layer composed of the embroidery 70.

As a modified example of the third embodiment, the metal fabric 10 may have a cloth member made of a cloth material stitched thereto, in place of, or in addition to the embroideries 70. In other words, a cloth member such as patch (applique) may be stitched to the metal fabric 10 used as a base. Weaving yarn composing the cloth material is preferably lower in Young's modulus than the metal threads for warp 30 and the metal threads for weft 20, and the cloth member is preferably lower in flexural rigidity than the metal fabric 10.

The cloth member is preferably a small piece having an area smaller than that of the metal fabric 10. The metal fabric 10 preferably has a plurality of cloth members stitched to the inner region thereof excluding the circumferential portion 12, leaving a space in between. In this way, the corner portions produced by folding the metal fabric 10 of this modified example may be reinforced with the cloth members, similarly to the third embodiment in which the corner portions produced by folding the metal fabric 10 were reinforced with the embroideries 70. In short, when the box-type container with corner portions is manufactured, it is recommendable to allocate each corner portion to each cloth member 70, by folding the metal fabric 10 having a single or a plurality of cloth members stitched thereon, along a plurality of fold lines that pass through the cloth members.

This invention is not limited to the above-described embodiments, and encompasses a variety of modified and improved embodiments so long as the purpose of this invention can be accomplished.

The metal fabric of this invention, composed by using the metal threads of a predetermined thickness for the warp and the weft, advantageously reduces the rigidity and sharpness of the metal threads, and allows the user to fold it with fingers like origami into an object in a safe manner. Since being composed of the metal threads, the metal fabric of this invention acquires a far higher morphological stability and higher weatherability as compared with the conventional paper-made origami, so that the resultant object can be appreciated over a long duration of time. Also the decoration of this invention, again formed by folding such metal fabric, has an excellent morphological stability and excellent weatherability, and therefore may be used suitably as accessories that are attached to human body or belongings.

The above-described embodiments encompass the technical spirits below.

(1) A sheet-like metal fabric which includes metal threads for warp as the warp and metal threads for weft as the weft, each of the metal threads for warp and the metal threads for weft having an average diameter of 0.03 mm or larger and 0.09 mm or smaller.

(2) The metal fabric according to (1), wherein the metal threads for warp and the metal threads for weft are plain-woven.

(3) The metal fabric according to (1) or (2), wherein the ends of at least a part of the metal threads for warp or the metal threads for weft are rounded into lumps.

(4) The metal fabric according to (3), wherein the diameter of the lump-like ends is larger than the average diameter of the metal threads for warp or the metal threads for weft, and not larger than four times the diameter.

(5) The metal fabric according to any one of (1) to (4), wherein a metal material composing each of the metal threads for warp and the metal threads for weft is any one selected from the group consisting of copper, copper alloy, aluminum alloy, stainless steel and titanium.

(6) The metal fabric according to any one of (1) to (5), wherein a metal material composing each of the metal threads for warp and the metal threads for weft is copper, red brass, brass or aluminum alloy, and has a mesh number of 120 mesh or larger and 160 mesh or smaller.

(7) The metal fabric according to any one of (1) to (5), wherein a metal material composing each of the metal threads for warp and the metal threads for weft is phosphor bronze, stainless steel or titanium, and has a mesh number of 160 mesh or larger and 250 mesh or smaller.

(8) The metal fabric according to any one of (1) to (7), wherein the surface of at least one of the metal threads for warp and the metal threads for weft presents a chromatic color.

(9) The metal fabric according to any one of (1) to (8), shaped in a square with a side of 100 mm or longer and 200 mm or shorter.

(10) The metal fabric according to any one of (1) to (9), having a punch-out portion that is configured to be separable from the surrounding portion of the metal fabric, as a result of breaking or detaching the punch-out portion.

(11) The metal fabric according to (10), wherein the outline of the punch-out portion includes a discontinued portion where the metal threads for warp and the metal threads for weft are discontinued, and a connecting portion where at least one of the metal threads for warp and the metal threads for weft remains connected.

(12) The metal fabric according to (11), wherein the ends of the metal threads for warp or the metal threads for weft, faced to the discontinued portion, are rounded into lumps.

(13) A sheet set which includes a plurality of the metal fabrics described in any one of (1) to (12), having integrally packaged therein a first sheet of the metal fabric whose metal threads for warp and metal threads for weft are composed of a copper alloy, consequently looks gold, and a second sheet of the metal fabric whose metal threads for warp and metal threads for weft are composed of an aluminum alloy or stainless steel, consequently looks silver.

(14) A decoration folded from the metal fabric described in any one of (1) to (12).

(15) Stationery folded from the metal fabric described in any one of (1) to (12).

(16) A container folded from the metal fabric described in any one of (1) to (12).

The above-described embodiments further encompass the technical spirits below.

(17) The metal fabric descried above, having an embroidery.

(18) The metal fabric according to (17), wherein the embroidery is composed of an embroidery thread larger in diameter and lower in Young's modulus than the metal threads for warp and the metal threads for weft.

(19) The metal fabric according to (17) or (18), wherein a single or a plurality of embroideries are formed in the inner region of the metal fabric excluding the circumferential portion thereof.

(20) A method of manufacturing a box-type container with corner portions, the methods includes folding the metal fabric described in any one of (17) to (19) along a plurality of fold lines that pass through each embroidery, to thereby allocate a corner portion to each embroidery.

(21) The metal fabric described above, having sewed thereon a cloth member made of a cloth material.

(22) The metal fabric according to (21), wherein a plurality of cloth members are stitched to the inner region of the metal fabric excluding the circumferential portion, leaving a space in between.

(23) A method of manufacturing a box-type container with corner portions, the methods includes folding the metal fabric described in any one of (21) or (22) along a plurality of fold lines that pass through each cloth member, to thereby allocate a corner portion to each cloth member.

What is claimed is:

1. A sheet-like foldable metal fabric consisting of metal threads for warp as the warp and metal threads for weft as the weft, the metal threads optionally having a coating,
   each of the metal threads for warp and the metal threads for weft having an average diameter of 0.03 mm or larger and 0.09 mm or smaller,
   wherein the sheet-like metal fabric has such a morphological stability that an object made by folding the sheet-like metal fabric with fingers of a user can be kept, and
   wherein the metal fabric has a punch-out portion that is configured to be separable from the surrounding portion of the metal fabric, as a result of breaking or detaching the punch-out portion.

2. The metal fabric according to claim 1, wherein the metal threads for warp and the metal threads for weft are plain-woven.

3. The metal fabric according to claim 1, wherein the ends of at least a part of the metal threads for warp or the metal threads for weft are rounded into lumps.

4. The metal fabric according to claim 3, wherein the diameter of the lump-like ends is larger than the average diameter of the metal threads for warp or the metal threads for weft, and not larger than four times the diameter.

5. The metal fabric according to claim 1, wherein a metal material composing each of the metal threads for warp and the metal threads for weft is any one selected from the group consisting of copper, copper alloy, aluminum alloy, stainless steel and titanium.

6. The metal fabric according to claim 1, wherein a metal material composing each of the metal threads for warp and the metal threads for weft is copper, red brass, brass or aluminum alloy, and has a mesh number of 120 mesh or larger and 160 mesh or smaller.

7. The metal fabric according to claim 1, wherein a metal material composing each of the metal threads for warp and the metal threads for weft is phosphor bronze, stainless steel or titanium, and has a mesh number of 160 mesh or larger and 250 mesh or smaller.

8. The metal fabric according to claim 1, wherein the surface of at least one of the metal threads for warp and the metal threads for weft presents a chromatic color.

9. The metal fabric according to claim 1, wherein
   the metal fabric is shaped in a square with a side of 100 mm or longer and 200 mm or shorter.

10. The metal fabric according to claim 1, wherein the outline of the punch-out portion comprises a discontinued portion where the metal threads for warp and the metal threads for weft are discontinued, and a connecting portion where at least one of the metal threads for warp and the metal threads for weft remains connected.

11. The metal fabric according to claim 10, wherein the ends of the metal threads for warp or the metal threads for weft, faced to the discontinued portion, are rounded into lumps.

12. A sheet-like foldable metal fabric consisting of metal threads for warp as the warp and metal threads for weft as the weft, the metal threads optionally having a coating,
    each of the metal threads for warp and the metal threads for weft having an average diameter of 0.03 mm or larger and 0.09 mm or smaller,
    wherein the sheet-like metal fabric has such a morphological stability that an object made by folding the sheet-like metal fabric with fingers of a user can be kept,
    wherein the metal fabric has an embroidery, and
    wherein the embroidery is composed of an embroidery thread larger in diameter and lower in Young's modulus than the metal threads for warp and the metal threads for weft.

13. A box-type container folded from the metal fabric described in claim 12, the container having a corner portion, and the corner portion being formed by folding the metal fabric along a plurality of fold lines that pass through the embroidery.

14. The metal fabric according to claim 1, having sewed thereon a cloth member made of a cloth material.

15. A box-type container folded from the metal fabric described in claim 14, the container having corner portions, each corner portion being formed by folding the metal fabric along a plurality of fold lines that pass through the cloth member.

16. A sheet set comprising a plurality of metal fabrics, wherein each of the metal fabrics is a sheet-like foldable metal fabric consisting of metal threads for warp as the warp and metal threads for weft as the weft, the metal threads optionally having a coating,     each of the metal threads for warp and the metal threads for weft having an average diameter of 0.03 mm or larger and 0.09 mm or smaller,     wherein each of the sheet-like metal fabrics has such a morphological stability that an object made by folding each of the sheet-like metal fabrics with fingers of a user can be kept, and     wherein the sheet set has integrally packaged therein the metal fabrics comprising: a first metal fabric whose metal threads for warp and metal threads for weft are composed of a copper alloy, consequently looks gold; and a second metal fabric whose metal threads for warp and metal threads for weft are composed of an aluminum alloy or stainless steel, consequently looks silver.

17. A decoration folded from the metal fabric described in claim 1.

18. Stationery folded from the metal fabric described in claim 1.

* * * * *